United States Patent [19]

Fox

[11] Patent Number: 4,492,273

[45] Date of Patent: Jan. 8, 1985

[54] ROTARY SURFACE CULTIVATOR

[75] Inventor: John V. Fox, Stratford on Avon, England

[73] Assignee: Bomford & Evershed Limited, Worcestershire, England

[21] Appl. No.: 524,673

[22] Filed: Aug. 19, 1983

Related U.S. Application Data

[63] Continuation of Ser. No. 240,397, Mar. 4, 1981, abandoned.

[30] Foreign Application Priority Data

Mar. 11, 1980 [GB] United Kingdom ............... 8008145

[51] Int. Cl.³ .................. A01B 21/04; A01B 33/02
[52] U.S. Cl. .................................. 172/520; 172/556
[58] Field of Search ............... 172/520, 69, 540, 543, 172/548, 554, 556

[56] References Cited

U.S. PATENT DOCUMENTS

| | | | |
|---|---|---|---|
| 145,177 | 12/1873 | Hoffmeyer | 172/520 X |
| 466,771 | 1/1892 | Clark | 172/520 |
| 1,641,393 | 9/1927 | Mackie | 172/69 |
| 2,722,876 | 11/1955 | London | 172/520 |
| 3,970,012 | 7/1976 | Jones | 172/520 |
| 4,315,547 | 2/1982 | Rau | 172/520 |

OTHER PUBLICATIONS

Implements of Agriculture published 1834 J. Ridgway, London p. 72.

Primary Examiner—Richard J. Johnson
Attorney, Agent, or Firm—Watson, Cole, Grindle & Watson

[57] ABSTRACT

A soil cultivating implement or machine has a tined rotor mounted on a frame for rotation about an axis transverse to the intended direction of movement of the implement, and with the tines penetrating the ground in use. The tines are arranged to enter the ground in the same sense as the forward movement of a vehicle driving the implement. The rotor is connected to a second tined rotor which rotates faster than the first rotor which rotates in the same direction as the wheels of the vehicle but at a lower peripheral speed than the speed of movement of the implement over to the ground. The ratio of the rotational speeds of the two rotors is between 2:1 and 4:1. Each rotor has a rotor shaft with a plurality of axially spaced mounting flanges, the tines being bolted to the flanges and extending generally tangentially of the rotor shaft.

2 Claims, 7 Drawing Figures

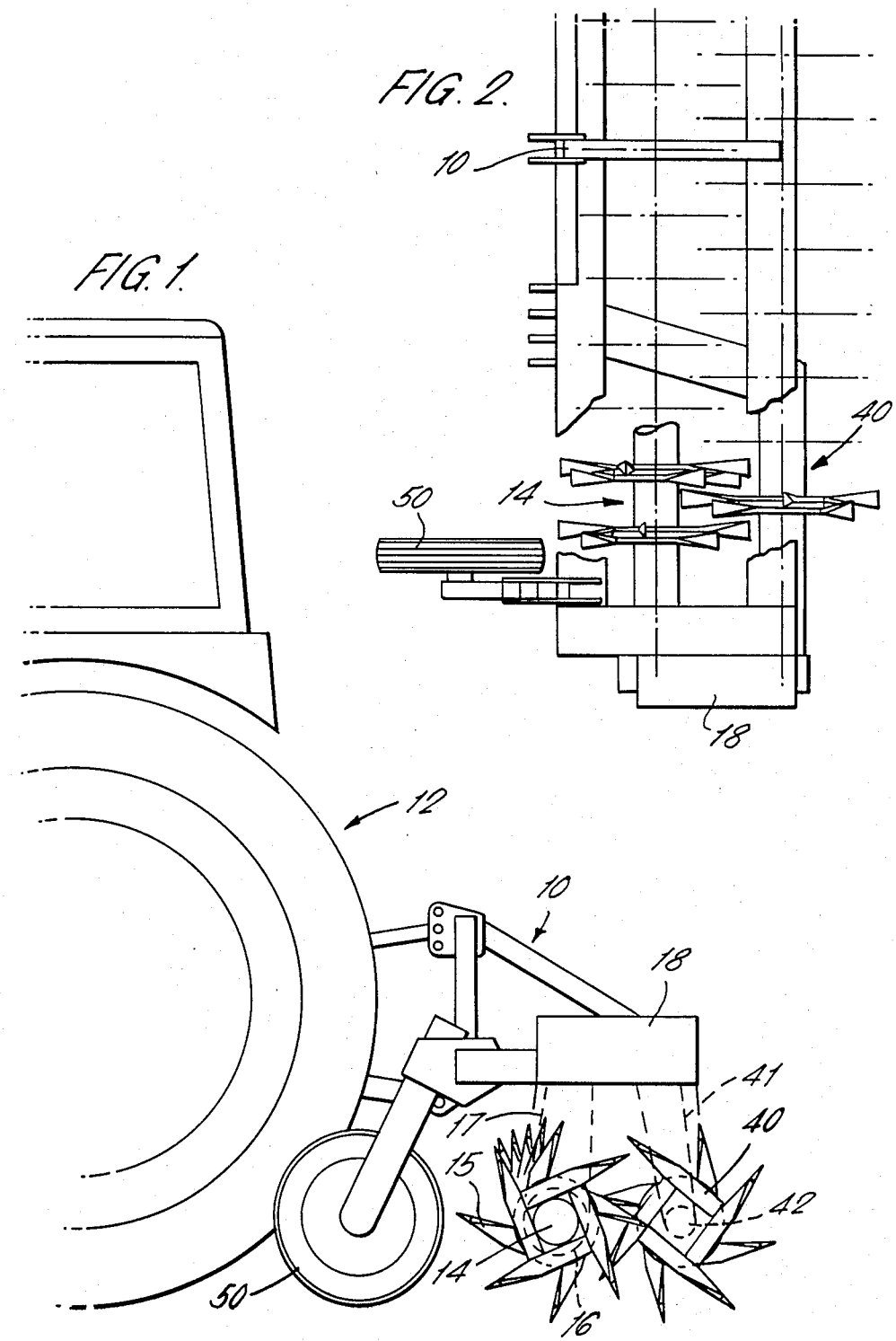

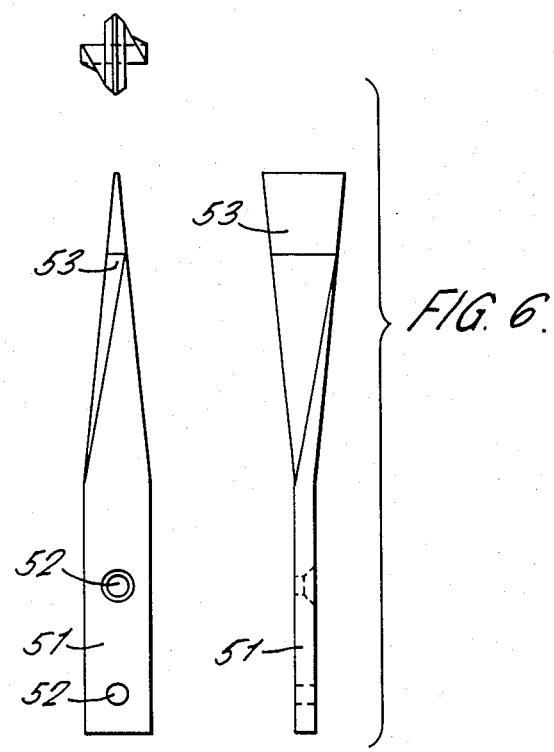
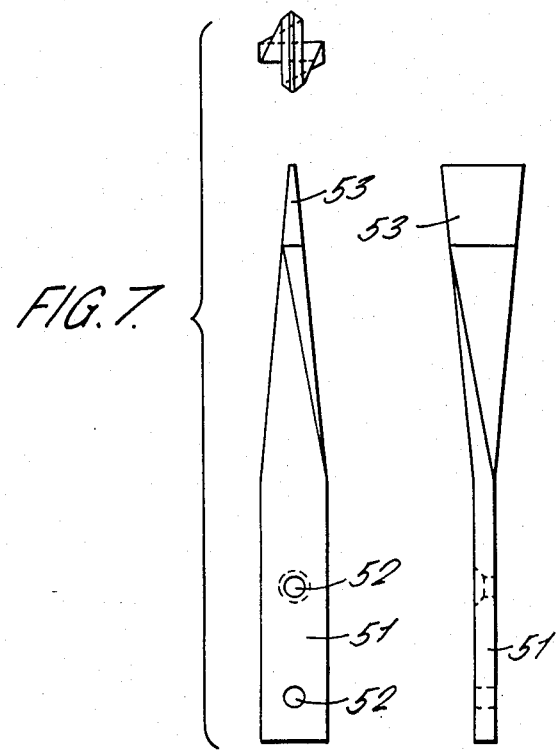

ROTARY SURFACE CULTIVATOR

RELATED APPLICATION

This application is a continuation of U.S. Ser. No. 240,397 filed Mar. 4, 1981, now abandoned.

BACKGROUND OF THE INVENTION

The invention relates to soil surface cultivating machine of the kind comprising a tined rotor.

Soil surface cultivators have been provided for many years and have the requirement that there should be a shallow tillage of the surface of the ground and this should ideally be carried out at a relatively high speed of movement over the ground.

The problem which has consistently arisen with rotary cultivators of the power-driven kind is that in order to obtain a high rate of work at a shallow depth a very large amount of power is required.

It has generally in the past been assumed that when the surface cultivator comprises a rotary device rather than a reciprocating device the rotor must run in the same direction as the wheels of a tractor pulling the device and at a higher peripheral speed than the forward speed of the implement, and since power absorption is in part a function of the speed of the rotor tines through the soil a high power requirement results.

Similarly in those embodiments where the rotor is arranged to run in the opposite direction to that of the wheels of the pulling vehicle the speed of the tines through the soil is the sum of their peripheral speed and the forward speed of the implement, and the power requirement is correspondingly high.

Thus, single rotor cultivators have generally had a high power requirement.

Proposals have also been made for other forms of soil working devices, such as pulverizers and root grubbers in which one rotor or rotary device is used to drive another rather than using the power take-off of a tractor to which the device is attached. U.S. Pat. No. 2,722,876 (London), for example, describes a soil pulverizer in which two pronged rotors are interconnected by a chain such that there is a slight rotational speed difference between the rotors. This device, is, however, wholly unsuitable for soil surface cultivation of the kind with which this invention is concerned because thr prongs of the London device will not till the soil.

A root grubber is described in U.S. Pat. No. 2,771,828 (Troeng et al) in which a wheel frictionally engages the ground in order to drive a raking wheel eccentrically so that the raking claws have a relatively low speed while scratching the roots away and the raking wheel has a relatively higher speed as it passes from one claw to the next. Again, this machine is unsuitable as a soil surface cultivator because the claws of the raking wheel scratch the ground rather than engaging and lifting the soil and the friction wheel does not engage the soil in order to lift the soil.

SUMMARY OF THE INVENTION

The present invention is based on a completely different concept from known practice in that is provides for a tined rotor which rotates in the same direction as the wheels of a tractor drawing the implement, but at a lower peripheral speed.

Accordingly the invention provides a soil surface cultivating machine comprising a first horizontally elongate rotor shaft having a plurality of axially spaced mounting means thereon, a plurality of tines removably secured to said means, each tine having a flat spade end portion, the tines having one end portion fixed to the rotor so that the spade end portions extend generally tangentially of the rotor shaft to enter the ground in the same direction as the intended forward direction of the movement of the machine for engaging and lifting the soil surface, the rotor being arranged to extend across the machine with the tines arranged along the rotor, means to mount said rotor for rotation about an axis substantially transverse to the intended direction of movement of the machine with the tines penetrating the ground, a second rotor shaft having a plurality of axially spaced mounting means thereon and a plurality of tines each having a flat spade end portion, the tines of the second rotor being removably fixed to said mounting means so that the spade portions thereof extend generally tangentially of the second rotor shaft and enter the ground in the opposite sense to the tines of the first rotor in soil lifting and working contact with the ground, the axes of the rotors being parallel and spaced apart such that the tines of one rotor pass between the tines of the other rotor, the second rotor being drivingly connected to the first rotor so as to rotate at a faster speed than the first rotor and to rotate in the same direction as the wheels of a vehicle when driving the machine and the first rotor but with the first rotor tines moving through the ground at a peripheral speed slower than the speed of movement over the ground of the machine, the speeds of rotation of the first and second rotors being directly proportional and in the ratio of between 1:2 and 1:4.

Preferably the machine includes means to control the depth to which the tines of at least the first rotor penetrate the ground.

In order to give a fuller understanding of the invention some specific examples of soil cultivating machine according to the invention will now be described with reference to the accompanying drawings.

BRIEF DESCRIPTION OF THE DRAWINGS

FIGS. 1 and 2 are a side elevation and a part plan view respectively of a first embodiment of the invention with two rotors and depth wheels, parts of the machine being omitted for clarity;

FIGS. 6 and 7 show each three views of a pair of tines one being handed in each direction.

DESCRIPTION OF THE PREFERRED EMBODIMENTS

Figure 3:
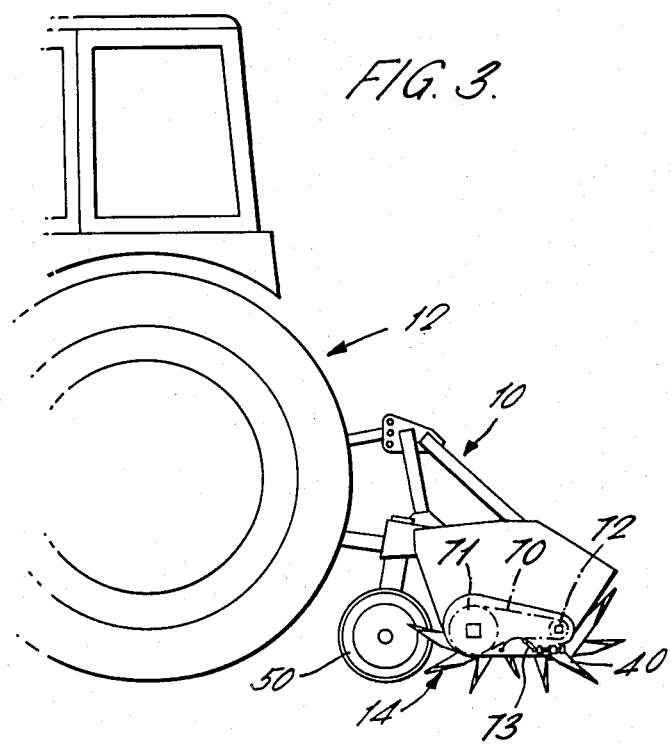
FIG. 3 is a view corresponding to FIG. 1 of a second embodiment.
Figure 5:
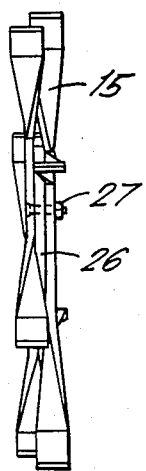
FIGS. 4 and 5 show respectively a side elevation and a plan view of part of the rotor assembly.

Referring first of all to FIGS. 1 and 2 the soil surface cultivating machine comprises a frame 10 which is connected in the usual way to the three point linkage of a tractor 12.

Suspended below the frame 10 is a first rotor 14 which extends across the rear of the tractor and is provided with a plurality of tines 15. The rotor 14 is connected by means of a sprocket 16 and a chain 17 to a gear box 18. The gear box 18 is in turn connected to a second tined rotor 40 by way of a chain 41 and a sprocket 42. The gearing is arranged so that the rotor 40 rotates faster than the first tined rotor 14, the preferred ratio being between 2:1 and 4:1; and so that the two rotors are drivingly connected together.

The general construction of the rotors 14, 40 is shown in more detail in FIGS. 4 to 7 and it will be seen that each rotor comprises a shaft 25 having a number of axially spaced apart flanges 26 which provide mounting means for the tines 15. Each tine 15 is bolted to its respective flange by means of two bolts 27 and extends generally tangentially of the rotor shaft. The preferred arrangement is such that each bolt connects two tines to the respective flange so that there are only the same number of bolts as tines.

FIGS. 6 and 7 show the actual construction of the tines 15. As can be clearly seen in FIGS. 6 and 7, each tine comprises a mounting portion 51 having two bolt holes 52 for connecting the two to its respective flange 26, and a flat spade end portion 53 which is twisted by 90° relative to the mounting portion 51 so that when the tine is bolted to its respective flange, the spade end portion 53 extends generally tangentially of the rotor shaft 25 to enter the ground (when the machine is in use) in soil lifting engagement.

From a comparison of FIGS. 6 and 7, it will also be seen that the tines are "handed", the spade end portion 53 of the FIG. 6 tine being twisted relative to the mounting portion 51 in the opposite direction to the spade end portion 53 of the FIG. 7 tine.

Figure 4:
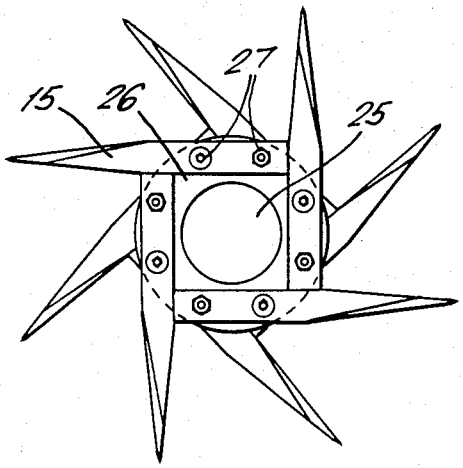

It will also be seen from a close scrutiny of FIG. 4 that adjacent tines around the rotor are differently handed, and that the tines on successive flanges 26 are radially offset relative to each other so that in use of the machine the tines on successive flanges enter the ground in sequence. For clarity in FIG. 1, only one set of tines has been shown on rotor 40.

FIG. 2 shows that the rotor shafts 25 of the rotors 14, 40 are parallel and spaced apart and that they are eight or nine flanges 26 on the respective rotor shafts in approximately half the width of the machine. It will, however, be appreciated that any convenient number of flanges may be spaced across the machine depending on the width of ground working required.

It will further be seen that the two tined rotors are so spaced apart and have their tines staggered that the tines interengage to the extent that the tines of one rotor will sweep and tend to clear the spaces between the tines of the other rotor.

A pair of depth wheels 50 are provided one at each end of the machine to control the depth to which the rotors penetrate.

In operation of the machine, the tractor moves forward and the tined rotors are arranged by adjustment of wheels 50 to penetrate the ground at a desired depth. It will be appreciated that the movement of the tractor will cause the tined rotors to tend to rotate in the same direction as the tractor wheels. However the second rotor 40 is rotating faster than the first rotor 14, and the first rotor 14 is rotating at such a speed that the first rotor tines are moving through the ground at a peripheral speed slower than the speed of movement over the ground of the machine. The effect of this is that the first rotor tines enter the ground in the same direction as the forward direction of movement of the tractor wheels (and the machine) for engaging and lifting the soil surface while the second rotor tines enter the ground in the opposite sense to the tines of the first rotor and in soil lifting and working contact with the ground.

As mentioned above, the gearing of the rotors is such that the relative speeds of the tines through the ground are in the ratio of between 1:2 and 1:4 and preferably about 1:3.

FIG. 3 shows an arrangement similar to FIGS. 1 and 2 except that the two rotors 14, 40 are connected together by a simple chain 70 connected to sprockets 71 and 72 on the rotors. A chain tensioner 73 is provided in the usual way.

I claim:

1. A soil surface cultivating machine comprising a first forward horizontally elongate rotor shaft having a plurality of axially spaced mounting means thereon, a plurality of tines each having one end removably secured to said means, each tine having a flat spade end portion, the tines being positioned on said rotor so that the spade end portions are positioned generally tangentially of the underside of the rotor shaft when the tines extend forwardly to enter the ground and rotate in the same direction as the intended forward direction of the movement of the machine for engaging and lifting the soil surface, the rotor being arranged to extend across the machine with the tines arranged along the length of the rotor, means to mount said rotor for rotation about an axis substantially tranverse to the intended direction of movement of the machine with the tines penetrating the ground, a second rearwardly positioned rotor shaft having a plurality of axially spaced mounting means thereon and a plurality of tines each having a flat spade end portion, the tines of the second rotor being removably fixed to said mounting means so that the spade portions thereof are positioned generally tangentially of the underside of the second rotor shaft when the tines extend to the rear and enter the ground in the opposite sense to the tines of the first rotor in soil lifting and working contact with the ground, the axes of the rotors being parallel and spaced apart such that the tines of one rotor pass between the tines of the other rotor, the second rotor being drivingly connected to the first rotor so as to rotate at a faster speed than the first rotor and to rotate in the same direction as the wheels of a vehicle when driving the machine, the speeds of rotation of the first and second rotors being directly proportional and in the ratio of between 1:2 and 1:4.

2. A soil cultivating machine as claimed in claim 1, further including means to control the depth to which the tines of at least the first rotor penetrate the ground.

* * * * *